(12) United States Patent
Berman et al.

(10) Patent No.: US 8,042,781 B2
(45) Date of Patent: Oct. 25, 2011

(54) ATTACHABLE HOLDER FOR ITEMS

(75) Inventors: Rod S. Berman, Los Angeles, CA (US); Rhiannon Aarons, Los Angeles, CA (US)

(73) Assignee: Rod S. Berman, Los Angeles, CA (US)

( * ) Notice: Subject to any disclaimer, the term of this patent is extended or adjusted under 35 U.S.C. 154(b) by 955 days.

(21) Appl. No.: 11/739,635

(22) Filed: Apr. 24, 2007

(65) Prior Publication Data

US 2008/0169408 A1 Jul. 17, 2008

Related U.S. Application Data

(63) Continuation-in-part of application No. 11/679,743, filed on Feb. 27, 2007, now Pat. No. 7,717,389, which is a continuation-in-part of application No. 11/623,708, filed on Jan. 16, 2007, now abandoned, which is a continuation-in-part of application No. 11/622,944, filed on Jan. 12, 2007, now abandoned.

(51) Int. Cl.
A47K 1/08 (2006.01)
(52) U.S. Cl. .................................... 248/316.8; 248/918
(58) Field of Classification Search ............... 248/309.1, 248/311.2, 316.8, 918
See application file for complete search history.

(56) References Cited

U.S. PATENT DOCUMENTS

| | | |
|---|---|---|
| 5,074,512 A | 12/1991 | Gianforcaro |
| 5,122,941 A | 6/1992 | Gross |
| 5,144,290 A | 9/1992 | Honda |
| 5,190,387 A | 3/1993 | Auth |
| 5,460,347 A | 10/1995 | Schacher |
| 5,489,075 A | 2/1996 | Ible |
| 5,611,513 A | 3/1997 | Rosen |
| 5,615,945 A | 4/1997 | Tseng |
| 5,762,306 A | 6/1998 | Day |
| 5,850,997 A | 12/1998 | Rosen |
| 5,906,348 A | 5/1999 | Orenstein |
| 6,010,104 A | 1/2000 | Hanson |
| 6,070,843 A | 6/2000 | Rosen |
| 6,173,947 B1 | 1/2001 | Johnson |
| 6,206,464 B1 | 3/2001 | Santa Rosa |
| 6,471,170 B2 | 10/2002 | Pook |
| 6,525,932 B1 * | 2/2003 | Ohnishi et al. ........... 361/679.41 |
| 6,550,737 B1 | 4/2003 | Sai |
| 6,561,824 B1 * | 5/2003 | Beckham et al. ............. 439/131 |
| 6,672,577 B2 | 1/2004 | Murvine |
| 6,749,166 B2 | 6/2004 | Valentine |
| 6,799,356 B2 | 10/2004 | Sanchez |
| 6,892,875 B2 | 5/2005 | DeVolpi |
| 7,004,596 B2 | 2/2006 | Merrem |
| 7,483,262 B2 | 1/2009 | Yin |

(Continued)

OTHER PUBLICATIONS

USPTO Office Action dated Nov. 16, 2009, in related U.S. Appl. No. 11/623,708.

(Continued)

*Primary Examiner* — Terrell McKinnon
*Assistant Examiner* — Steven Marsh
(74) *Attorney, Agent, or Firm* — Jeffer Mangels Butler & Mitchell LLP

(57) ABSTRACT

Provided herein is an item holder assembly that includes an attachment mechanism for attaching the assembly to an object such as a laptop computer, an item support or holder, and a member for connecting the attachment mechanism to the item holder or support.

9 Claims, 15 Drawing Sheets

U.S. PATENT DOCUMENTS

| | | |
|---|---|---|
| 2002/0066846 A1 | 6/2002 | Giulie |
| 2003/0133295 A1 | 7/2003 | Merrem |
| 2004/0264170 A1 | 12/2004 | Merrem |

OTHER PUBLICATIONS

USPTO Office Action dated Mar. 28, 2008, in related U.S. Appl. No. 11/622,944.
USPTO Office Action dated Dec. 30, 2008, in related U.S. Appl. No. 11/679,743.
Response to USPTO Office Action dated Dec. 30, 2008, in related U.S. Appl. No. 11/679,743.
USPTO Office Action dated Jun. 17, 2009, in related U.S. Appl. No. 11/679,743.
USPTO Office Action dated Mar. 28, 2008, in related U.S. Appl. No. 11/623,708.
Response to USPTO Office Action dated Mar. 28, 2008, in related U.S. Appl. No. 11/623,708.
USPTO Office Action dated Sep. 17, 2008, in related U.S. Appl. No. 11/623,708.
USPTO Office Action dated Nov. 17, 2008, in related U.S. Appl. No. 11/623,708.
Preliminary Amendment filed Dec. 17, 2008, in related U.S. Appl. No. 11/623,708.
USPTO Office Action dated Jan. 26, 2009, in related U.S. Appl. No. 11/623,708.
Response to USPTO Office Action dated Jan. 26, 2009, in related U.S. Appl. No. 11/623,708.
Printout of www.belkin.com showing Belkin TraveLite Retractable USB Lamp. This document is believed to have been publicly available more than one year before the filing date of U.S. Appl. No. 11/739,635.

* cited by examiner

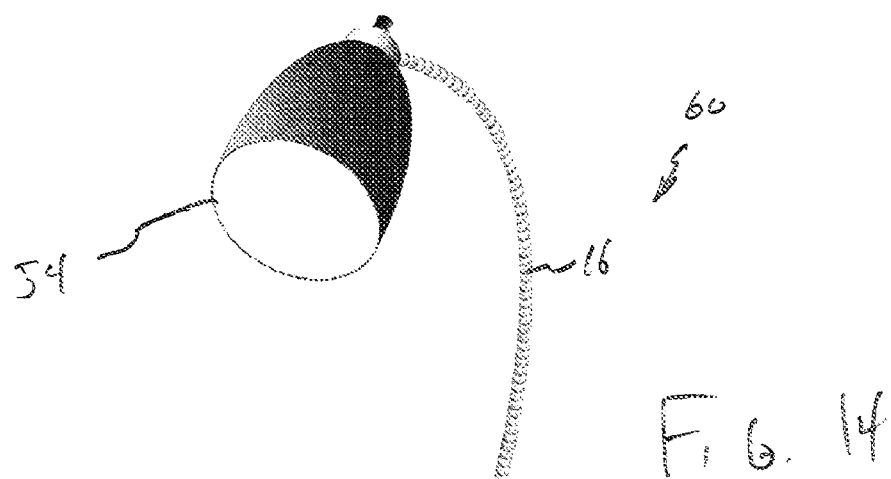
FIG. 14
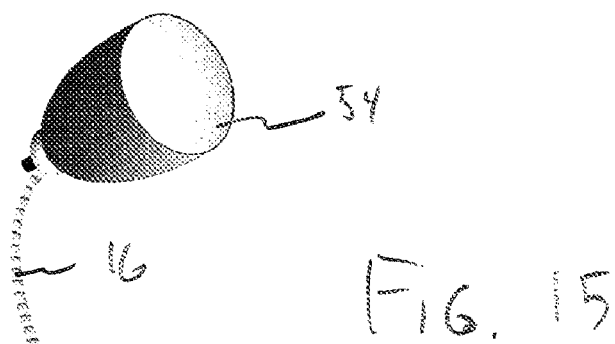
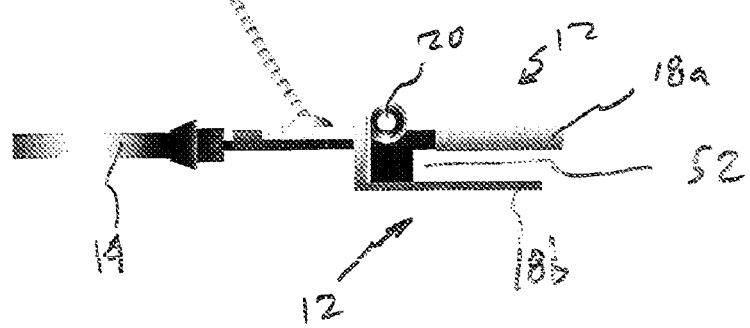
FIG. 15

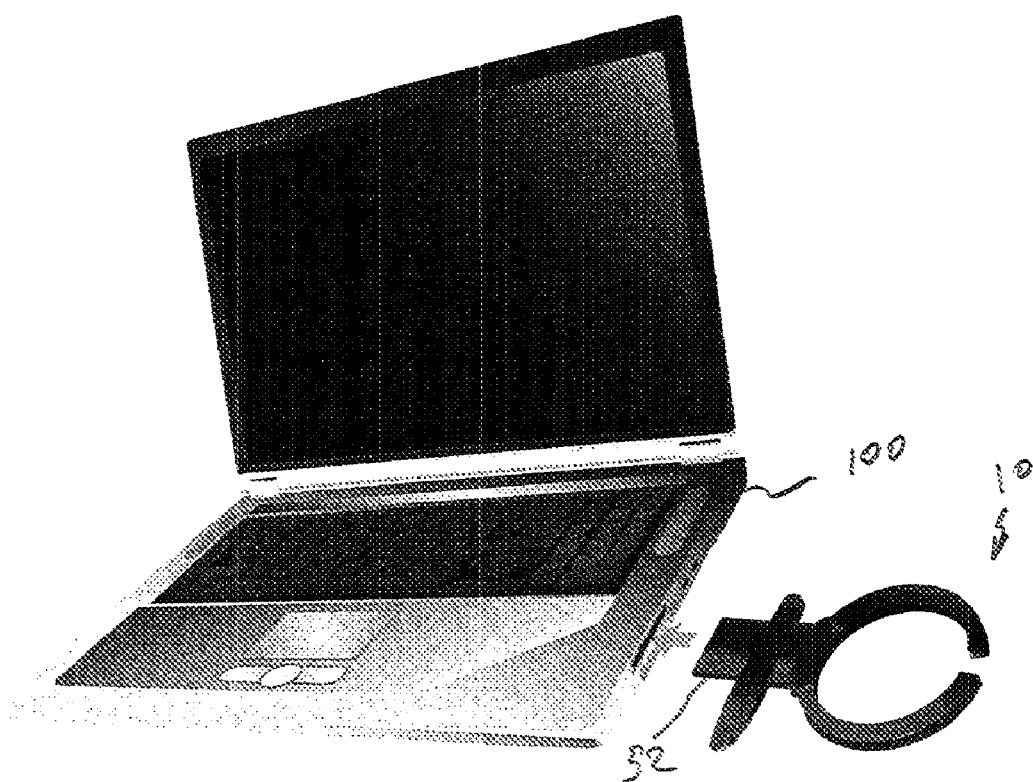
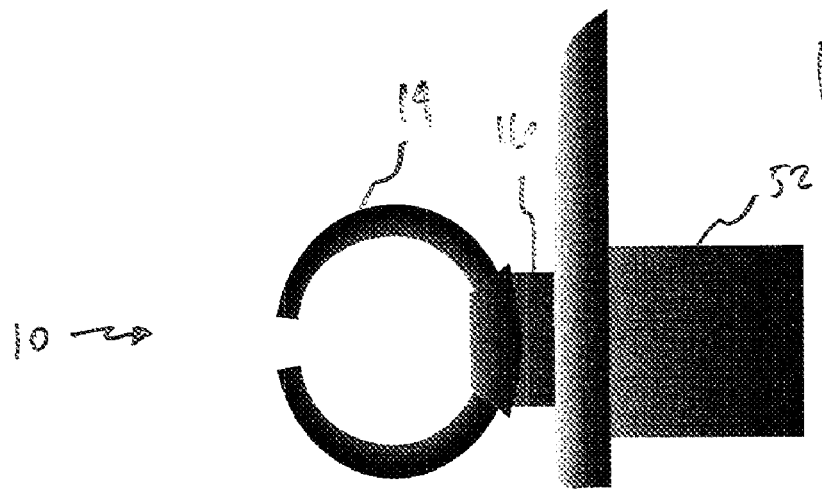

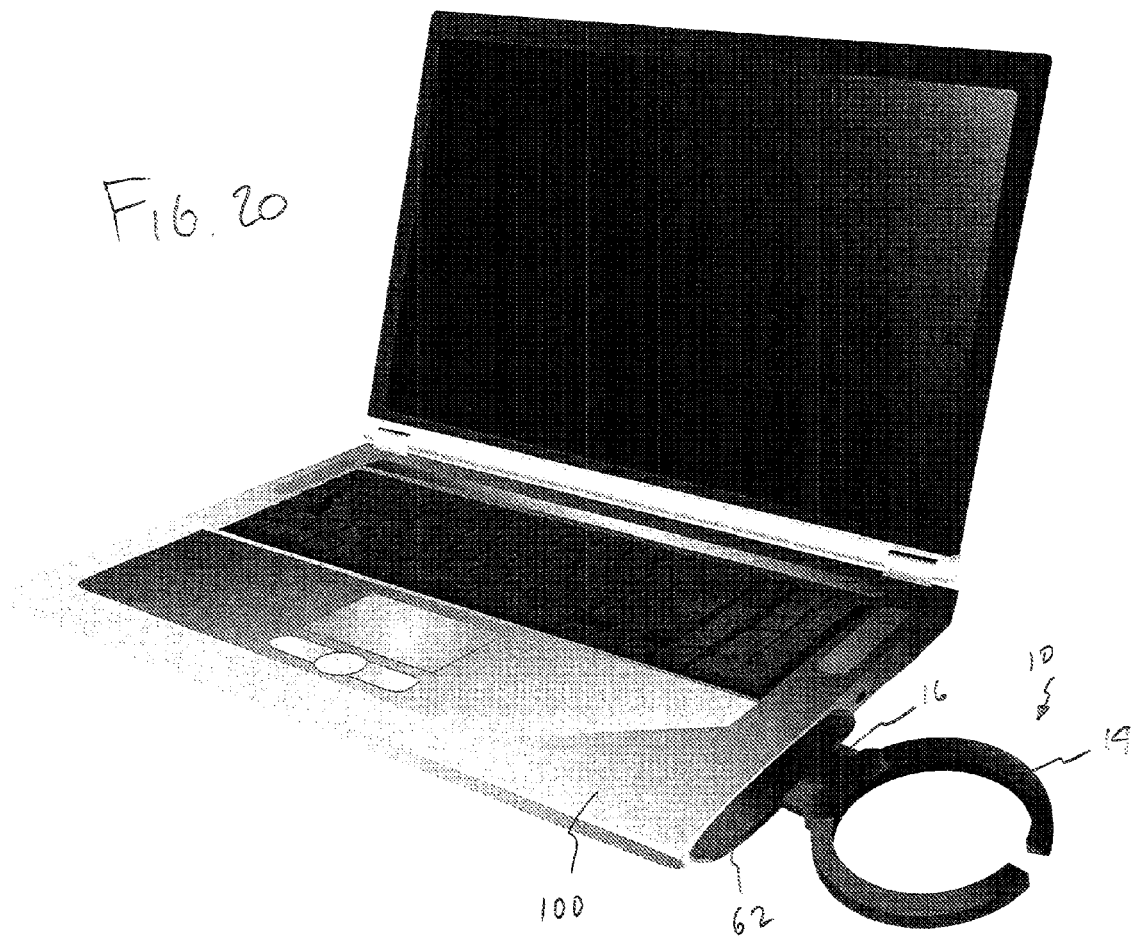

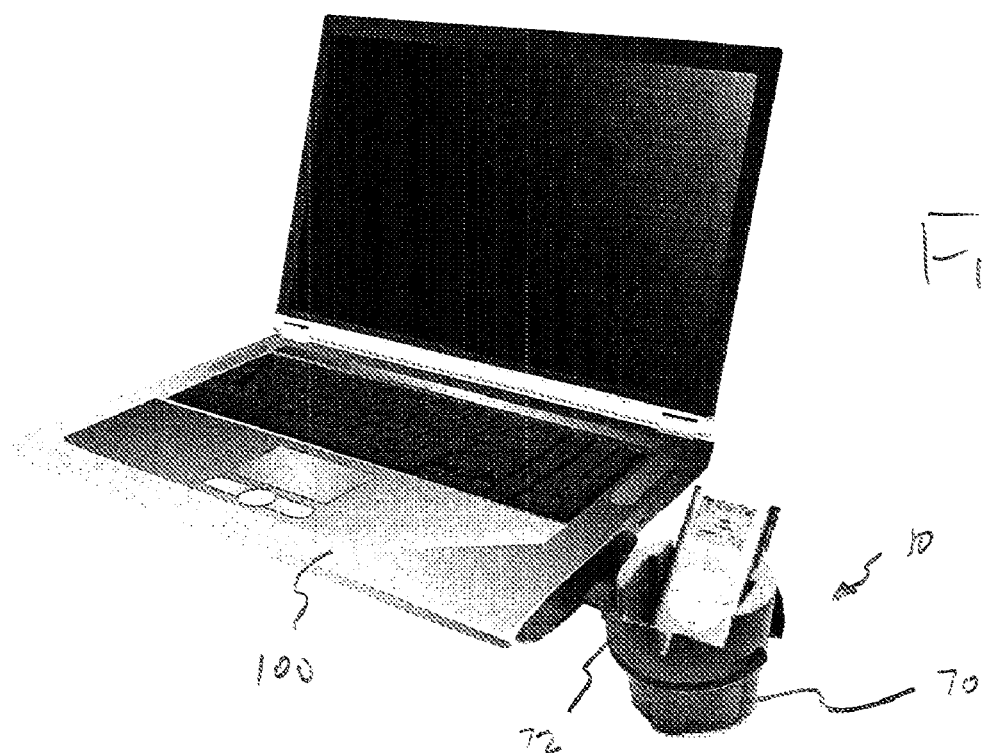

ATTACHABLE HOLDER FOR ITEMS

RELATED APPLICATION

This application is a continuation in part of U.S. application Ser. No. 11/679,743 entitled IMPROVED ATTACHABLE HOLDER FOR ITEMS filed Feb. 27, 2007, which is a continuation in part of U.S. application Ser. No. 11/623,708 entitled IMPROVED ATTACHABLE HOLDER FOR ITEMS filed Jan. 16, 2007, which is a continuation in part of U.S. application Ser. No. 11/622,944 entitled ATTACHABLE HOLDER FOR ITEMS filed Jan. 12, 2007, all of which are incorporated by reference herein in their entireties.

FIELD OF THE INVENTION

The present invention relates to attachable holders for items, and illustratively to an apparatus for holding a beverage container (such as a wine glass or soda can) or other items while a person works on a laptop.

SUMMARY OF THE PREFERRED EMBODIMENTS

In accordance with a first preferred aspect of the present invention there is provided an attachable holder assembly that includes an attachment mechanism for attaching the assembly to an object, an item holder, and an extension member connecting the attachment mechanism to the holder. In a preferred embodiment the items holder is a beverage container holder, the extension member is flexible and bendable, and the attachment mechanism comprises a clip. In another preferred embodiment, the assembly is provided in combination with a laptop computer.

In another aspect of the present invention, there is provided a device support assembly for connecting a device to a structure with a port. The assembly can include a first connector on the structure; an extension member; a second connector on the extension member which is compatible with the first connector; and a device, connectable to the extension member opposite the second connector, for use by the user of the structure. Preferably the first connector is a female port on the base of a laptop computer and the second connector is a male plug compatible with the female port. Preferably still, the extension member is a flexible and bendable or collapsible conduit which is sufficiently strong and rigid to support the device and which is bendable or collapsible so that the device can be placed by the user where desired spatially from the laptop computer base. In addition, the device support assembly can include a plurality of extension members, each having an end connected to the second connector, and each having a different device attached thereto. Alternatively, the device support assembly can include a plurality of extension members with each having a connector attached to the same or a different port on the structure, and wherein the device is connected to at least two of the plurality of extension members. This is especially helpful where the device is heavy and needs more than one extension connection to the computer structure to support it.

In yet another embodiment of the present invention, there is provided a first device for connecting to a second device having a holding or supporting function, where the first device is a CPU preferably a laptop computer having female jacks or ports for receiving male plugs from the second device. The second device can include means for supporting or holding an object associated with the male plugs and more preferably attached to, or connected to, or integral with the means for supporting or holding an object.

In yet another preferred embodiment of the present invention, the female jacks or male plugs can be made to snuggly mate so that there is little lateral movement between the plug and jack when the plug is received by the jack, to thereby give greater support to the second device. The plug can also include side extensions which are flush against the side of the laptop adjacent the jack to give further support to the second device.

The present invention also provides a method of supporting an object by using the laptop as the support wherein the object can be supported by the laptop on a plane above the plane of the upper surface of the laptop.

BRIEF DESCRIPTION OF THE DRAWINGS

FIG. 14 is a perspective view of the lamp and beverage holder connection assembly of FIG. 12.

FIG. 15 is a side elevational view of the lamp and beverage holder connection assembly of FIG. 12.

FIG. 18 is a perspective view of a laptop computer with the beverage holder assembly of FIG. 16 exploded therefrom.

FIG. 19 is a top plan view of the beverage holder assembly of FIG. 16.

FIG. 20 is a perspective view of a laptop computer with the beverage holder assembly of FIG. 16 connected in a port thereof.

FIG. 21 is FIG. 20 is a perspective view of a laptop computer with the beverage holder assembly of FIG. 16 connected in a port thereof with an mp3 player holding cup therein.

Like numerals refer to like parts throughout the several views of the drawings.

DESCRIPTION OF THE PREFERRED EMBODIMENTS

Figure 1:
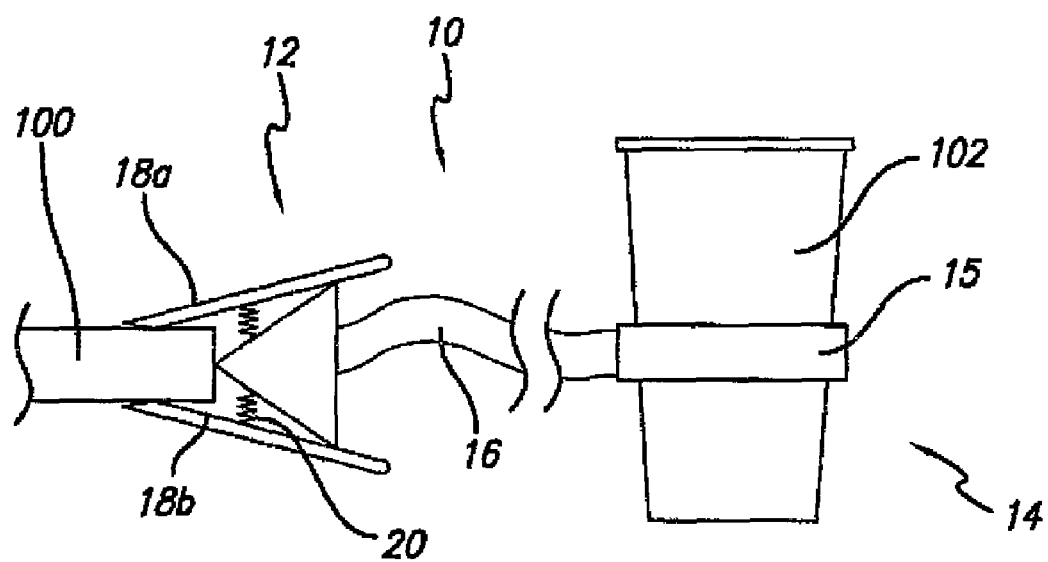
FIG. 1 is a side elevational view of a beverage container holder assembly in accordance with a preferred embodiment of the present invention.

As shown in the drawings, for purposes of illustration, a preferred embodiment of the invention is a beverage container holder assembly 10.

For exemplary purposes only, described hereinbelow is a preferred embodiment wherein the beverage container holder assembly is used with a laptop computer 100. For example, this embodiment would be useful for someone who likes to drink a glass of wine while operating the computer but does not have a convenient place to rest the glass of wine when operating the computer. However, this is not a limitation on the present invention. It will be understood that the beverage container holder assembly can be used on other items.

It will be appreciated that terms such as "front," "back," "top," "rear," "bottom," "side," and "below" used herein are merely for ease of description and refer to the orientation of the components as shown in the figures. It should be understood that any orientation of the beverage container holder assembly, and the components thereof described herein is within the scope of the present invention.

Figure 2:
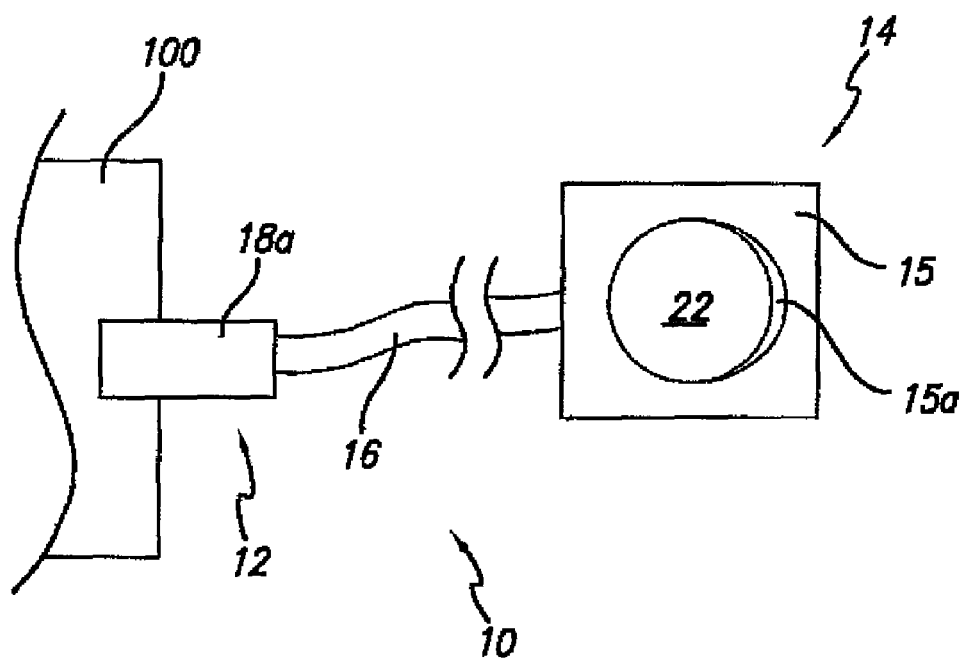
FIG. 2 is a top plan view of the beverage container holder assembly of FIG. 1.
Figure 3:
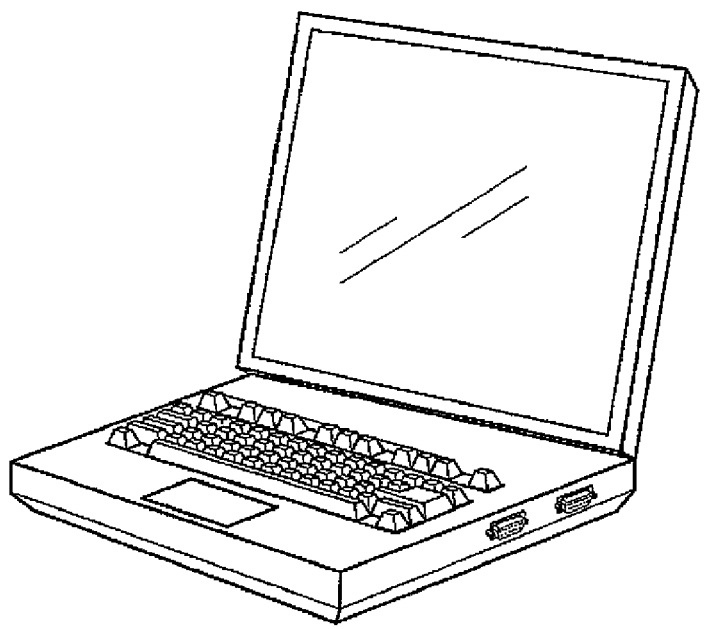
FIG. 3 is a general drawing of a standard prior art laptop computer with female side ports (rear ports not shown).
Figure 4:
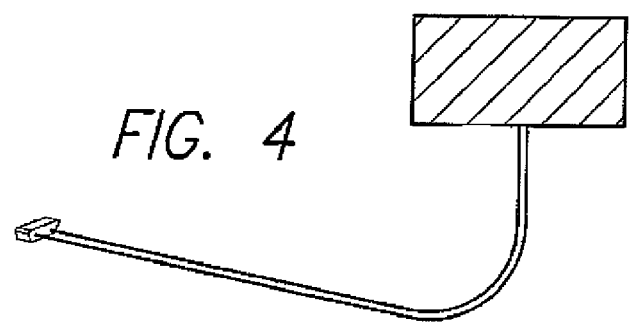
FIG. 4 is another embodiment of the present invention with a male plug at one end of the extension member and a general "box" representing item holders and useable devices.
Figure 5:
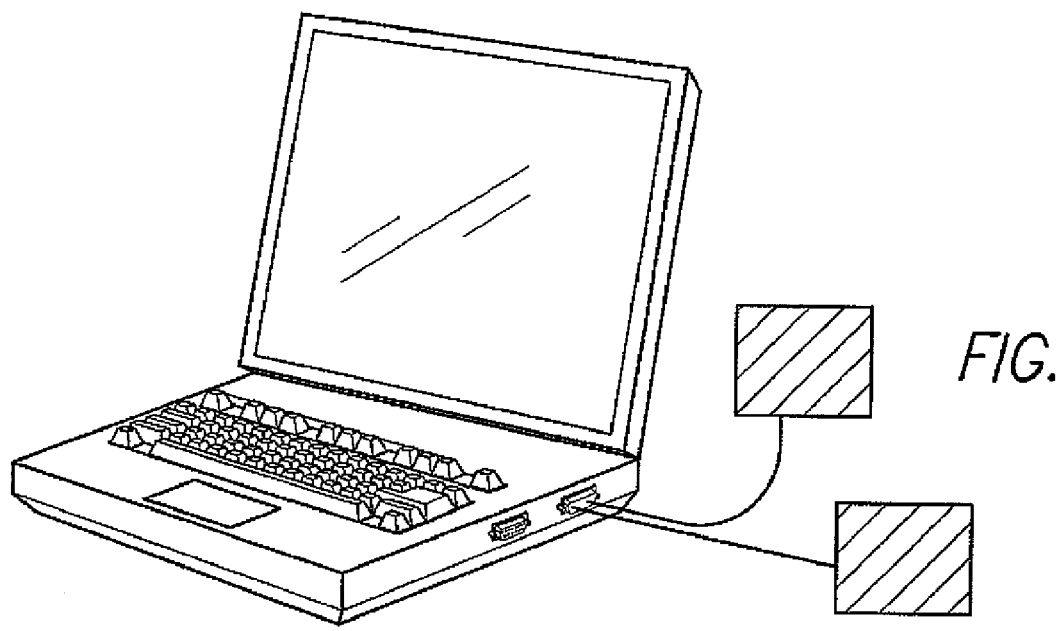
FIG. 5 is yet another embodiment of the present invention showing two extension members extending from a single computer port.
Figure 6:
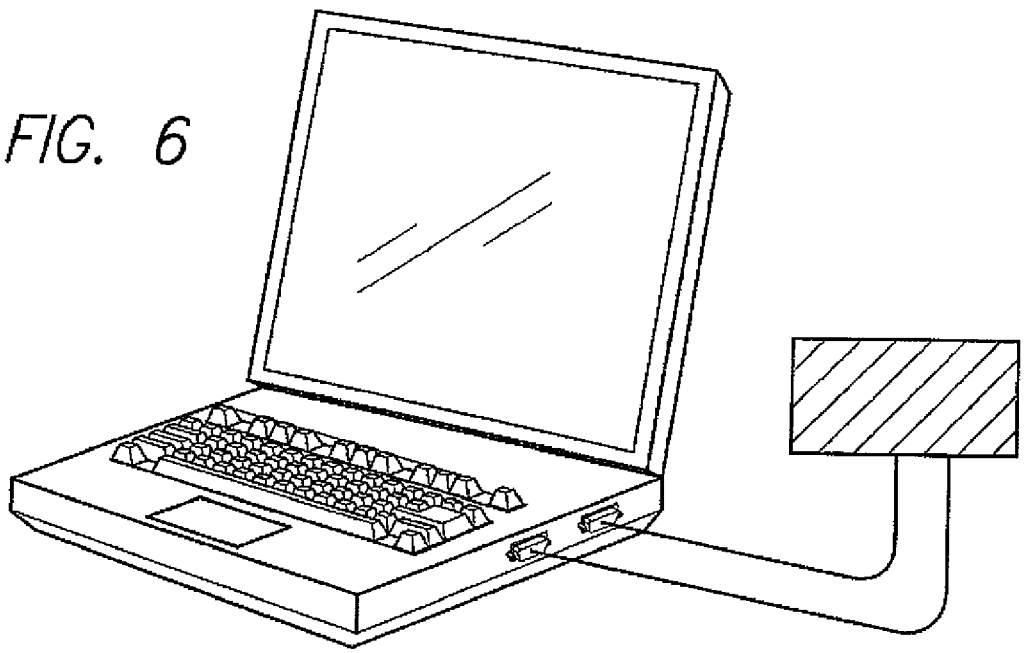
FIG. 6 is another embodiment of the present invention showing two extension members supporting a single item holder or device.
Figure 7:
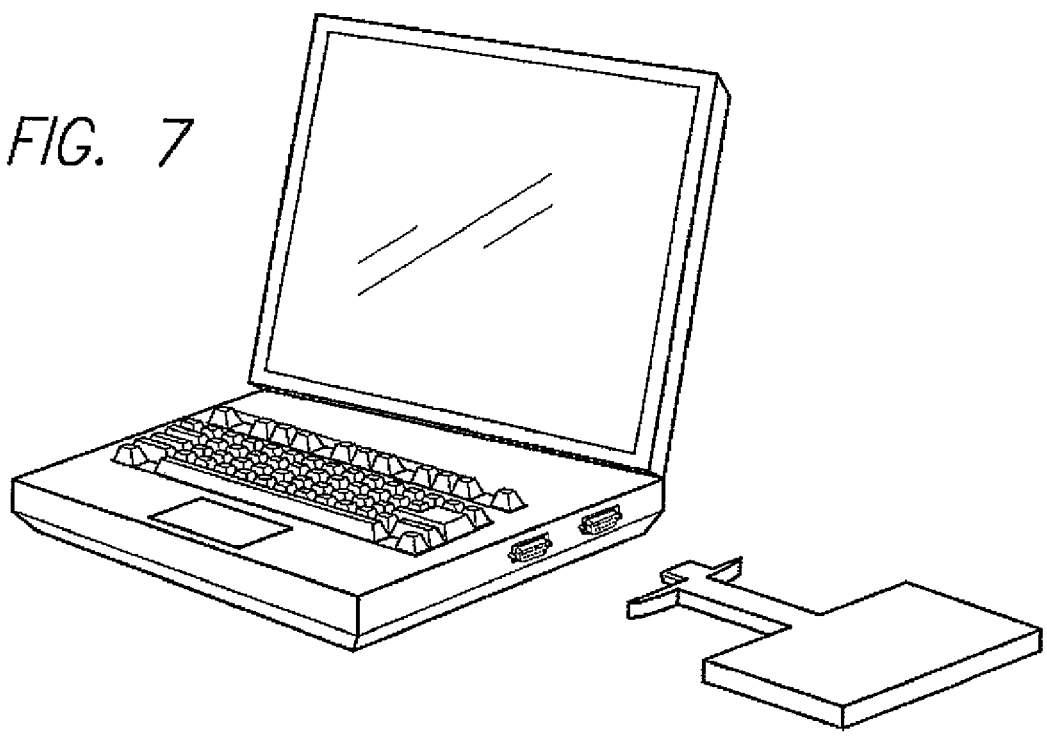
FIG. 7 is an embodiment of the plugs of the present invention showing the side extensions.
Figure 8:
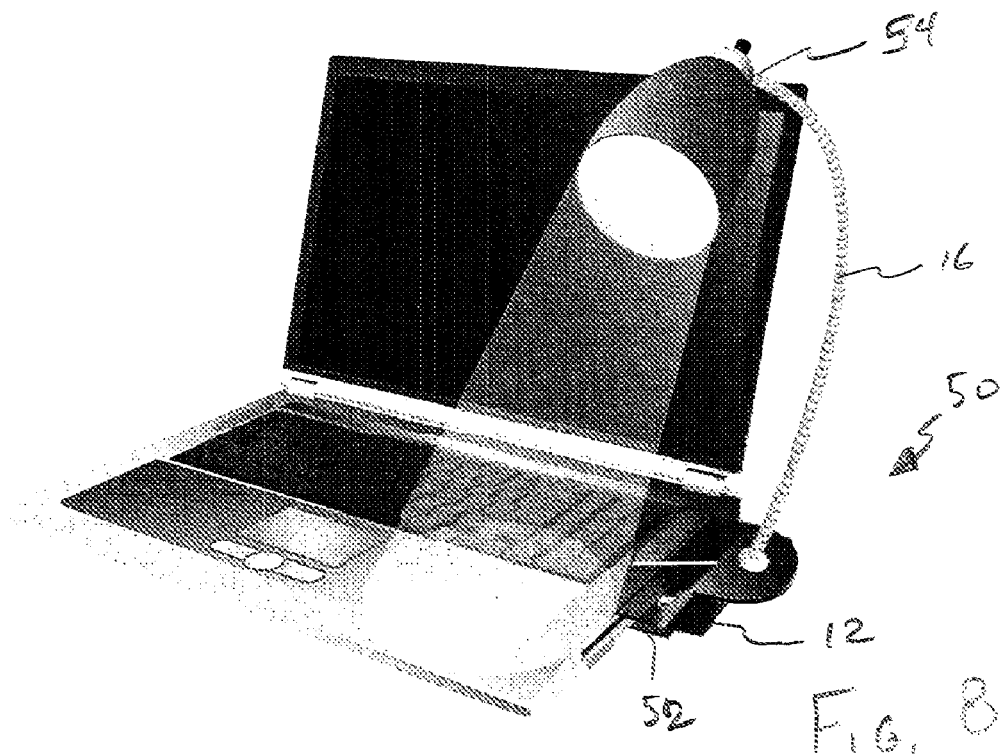
FIG. 8 is a perspective view of a laptop computer with a lamp connection assembly in accordance with a preferred embodiment of the invention connected thereto.
Figure 9:
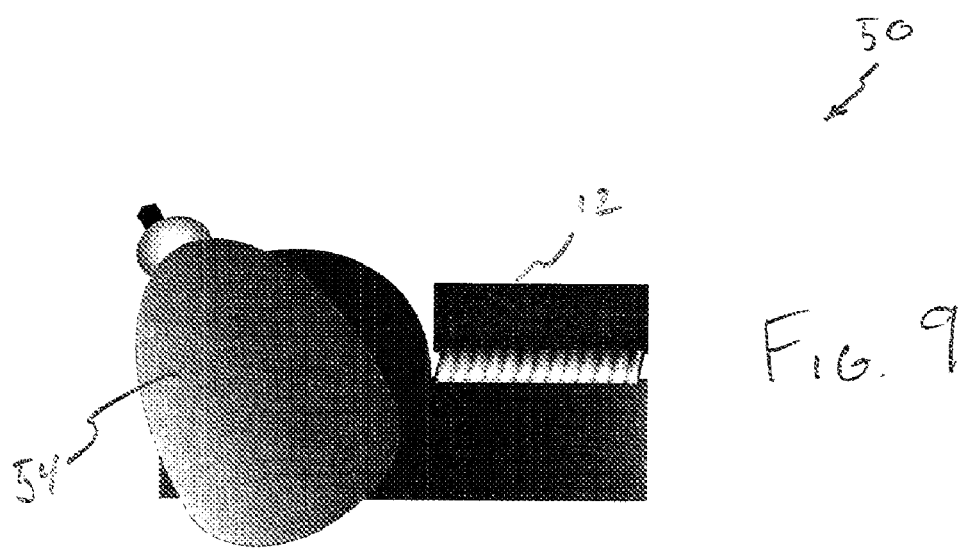
FIG. 9 is a top plan view of the lamp connection assembly of FIG. 8.
Figure 10:
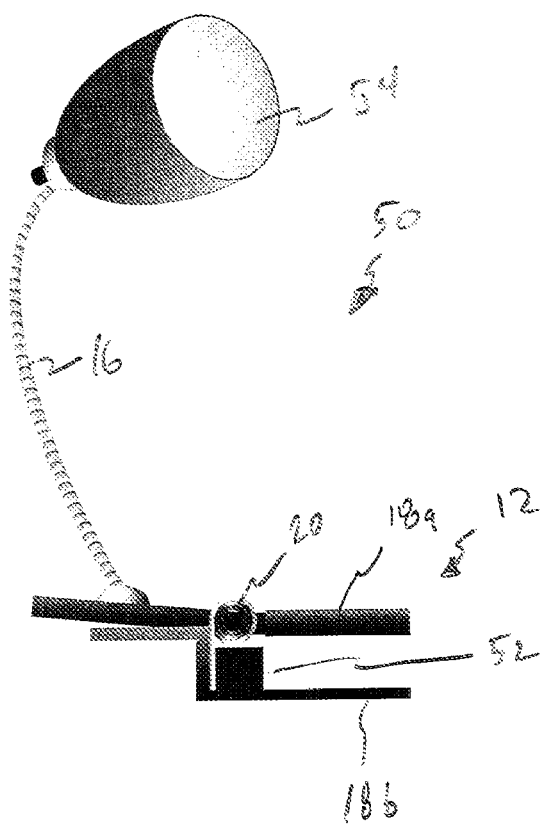
FIG. 10 is a side elevational view of the lamp connection assembly of FIG. 8.
Figure 11:
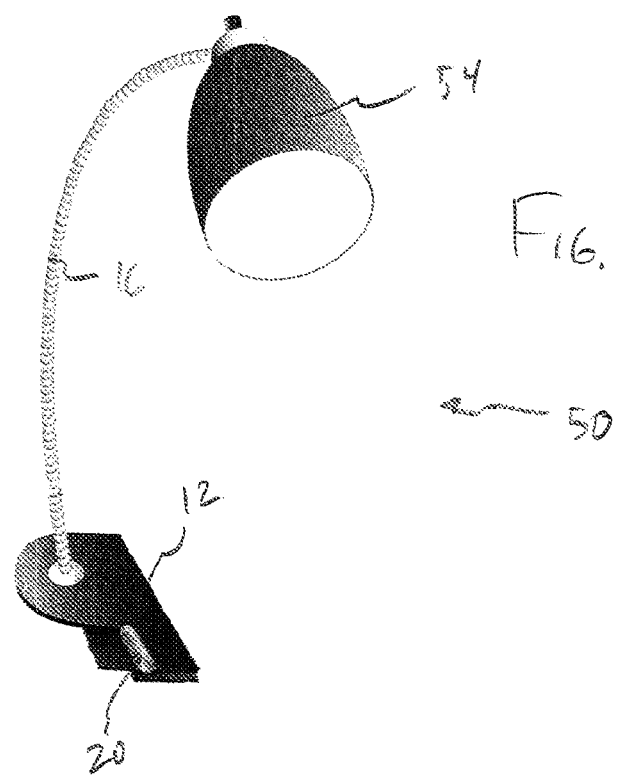
FIG. 11 is a perspective view of the lamp connection assembly of FIG. 8.
Figure 12:
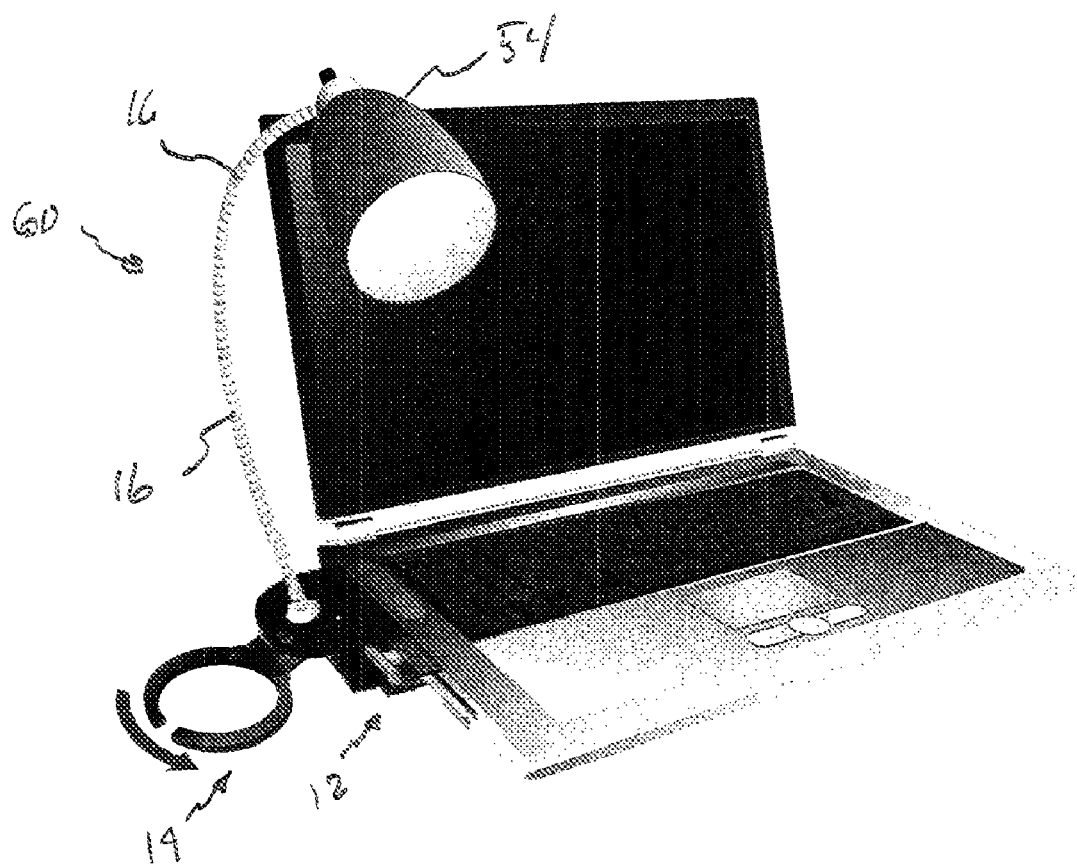
FIG. 12 is a perspective view of a laptop computer with a lamp and beverage holder connection assembly in accordance with a preferred embodiment of the invention connected thereto.
Figure 13:
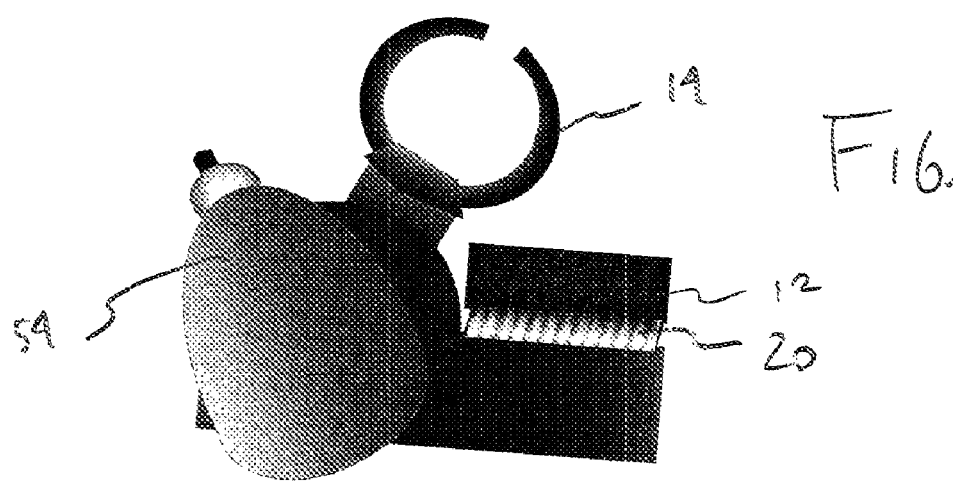
FIG. 13 is a top plan view of the lamp and beverage holder connection assembly of FIG. 12.
Figure 16:
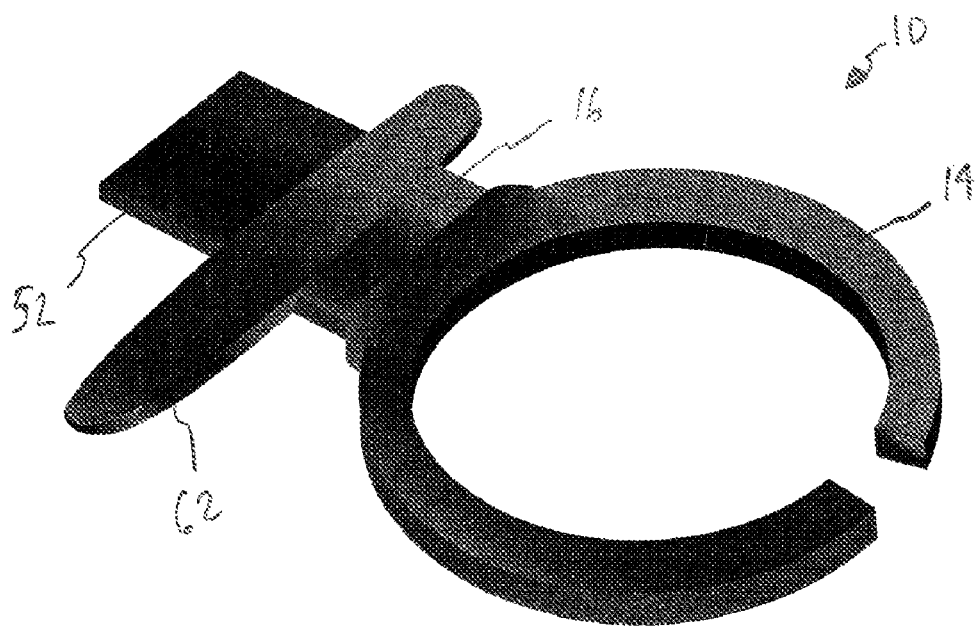
FIG. 16 is a perspective view of a beverage holder assembly in accordance with an embodiment of the invention.
Figure 17:
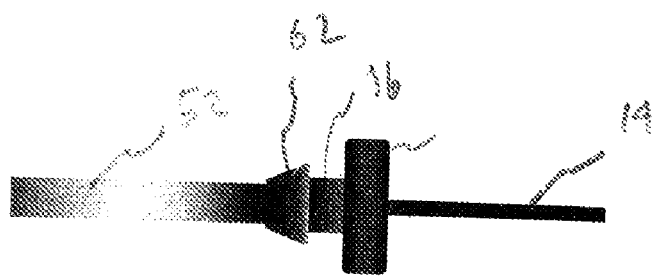
FIG. 17 is a side elevation view of the beverage holder assembly of FIG. 16.

Referring to FIGS. 1-2, the invention is preferably embodied in a beverage container holder assembly 10. The type of beverage container 102 is not a limitation on the present invention. For example, the container 102 can be a cup, can, bottle, etc.

Beverage container holder assembly 10 generally includes an attachment mechanism 12, a beverage container holder 14 and an extension member 16 extending therebetween. In a preferred embodiment, the attachment member 12 is a clip. However, the attachment member 12 can also be a clamp or use other attachment means, such as screws, nuts, bolts, magnetics, etc. Any item that attaches the remaining components of the beverage container holder assembly 10 to a laptop or the like is within the scope of the present invention, provided it is adequate to maintain the attachment while supporting the weight of the holder and the item in the holder.

In an exemplary embodiment where the attachment mechanism 12 is a clip, the clip includes two opposing portions 18a and 18b that clamp onto the laptop 100. These two opposing portions 18a and 18b are normally biased in a closed position by a spring 20 or the like. When the distal ends of the clip are moved inwardly, the opposite ends spread apart, thereby allowing the clip to be affixed to the laptop 100.

It will be appreciated by those skilled in the art that the beverage container holder 14 can be any item for holding a beverage container. Many such items are known in the art. Generally, the beverage container holder includes an outer portion 15 that has a container receiving opening 22 defined therethrough. The outer portion 15 does not have to completely surround the opening 24, as long as a beverage container 102 can be supported therein.

In a preferred embodiment, the beverage container holder 14 includes an adjustable portion 15a that allows different sized containers 102 to be secured therein. This adjustable portion 15a can be spring biased. Example of such holders include those that are used for supporting beverages in automobiles such as BMW automobiles.

It will be appreciated by those skilled in the art that the extension member 16 is any component that extends between the attachment mechanism 12 and the beverage container holder 14, thereby allowing the beverage container holder 14 (and the container 102 therein) to extend away from the laptop 102 in a desired spatial relationship. In a preferred embodiment, the extension member 16 is a flexible rubber, plastic or metal (e.g., aluminum) cord, wire or tube or the like that allows the extension member 16 to be adjustable, thereby allowing the beverage container holder 14 to be positioned in a plurality of positions. The flexibility of the extension member can be achieved by a variety of structures known in the art and can be of desired lengths and thicknesses. Preferably, the assembly can be collapsed into a small structure for easy storage and transport and packaging, and it can also be held in a pouch. Preferably the length of the extension member can range from about 2 inches to 24 inches, more preferably 3 inches to 12 inches and even more preferably from 3 inches to 6 inches.

It will also be appreciated that in addition to a beverage container holder, the holder can include a container for holding items, such as, for example, pens, pencils, notepads, snack foods; other electronic devices such as ipods, radios, recorders, cameras, or it can be a tray for supporting any items of use to the user of the thing to which it is attached, such as a laptop. The holder can also be attached to the assembly in a manner whereby various different types of holders can be interchanged. Further, a customer could be provided with a kit containing the assembly with various holders, sizes of extension members and port connections.

The assembly can also be labeled with a variety of graphics including those of the laptop source or of the item source, so as to function for advertising. For example, the Coca-Cola Company could label the holders with the Cokes mark and thereby be used as a promotion.

In yet another embodiment of the invention, the extension member can be either a flexible or flexible tube, cord, wire, a collapsible and/or foldable structure or the like, with one end having attached thereto a device to be used by the computer operator and the other end having a clip or other means for attaching the extension member to a computer or other structure such as a table. The device can be any type of device of use to the user of the computer or other structure, such as a pencil, scissors, beverage holder, portable fan, etc.

In yet a further embodiment of the invention, the attachment mechanism can be a male component that connects to a corresponding female component or port on the computer or other structure. The computer or other structure can include a female port for receiving the male component. The male and female component can be configured to reversibly lock. Alternatively, the extension member can include a male plug that reversibly is received by the existing ports on the structure, for example, the ports on a laptop computer. Thus the male plug can include the number of prongs that a standard electrical cord has when plugging into the dial-up, high speed internet or printer ports of a lap top. Alternatively, the male connector can be on the structure such as the base of a computer and the female connector can be on the extension member.

In yet still a further embodiment of the invention, the extension member can include an electrical conduit so that the device at the device or holder end of the extension member can be in electrical or data communication with the input port on the computer. In addition, several extension members can be connected to the same connection component that connects to the structure such as the computer such that a single connection to the computer can support a variety of devices.

In addition to the foregoing, the attachment holder assembly components (attachment mechanism, item holder and extension member) may be a unitary structure that simply plugs into the structure (e.g., computer port) or each of the components can be reversibly connectable to each other to thereby facilitate a variety of assemblies with interchangeable parts. For example, the item holder can include a male or female port for reversibly connecting to one end of the attachment mechanism, and with the other end of the attachment mechanism similarly reversibly connectable to the structure port. Moreover, for some applications, for example where the item is to be closely spatially located to the computer, the extension member can be non-bendable and rigid.

FIGS. 8-28 show other preferred embodiments of the present invention.

FIGS. 8-11 show a lamp connection assembly 50 that includes a clamp or attachment mechanism 12 that is specifically designed to be secured to the side of a laptop as shown. The lamp connection assembly 50 also preferably includes a male component 52 that is secured in a female component such as a port, a lamp 54 and an extension member 16.

FIGS. 12-15 show a lamp and beverage holder connection assembly 60 that includes all the components of the lamp connection assembly 50, but also include a beverage container holder 14. Preferably the beverage container holder 14 is pivotable.

FIGS. 16-20 show another embodiment of a beverage container holder assembly 10 that generally includes a male component 52, an extension member 16 and a beverage container holder 14. In a preferred embodiment, the beverage container holder assembly 10 also includes an abutment member 62 that abuts the side of the laptop when plugged in, as shown in FIG. 20.

FIG. 21 shows the beverage container holder assembly 10 of FIGS. 16-20 with an ipod/media/mp3 player or other component holder 70 (referred to herein as a component holder 70). The component holder 70 is frustoconical so that it fits in the beverage container holder 14 and may include cut-outs 72 for arranging the media player as desired. In another embodiment, the component holder 70 may include the capability of automatically charging the component or mp3 player or ipod when it is plugged in. This may include a male component on the bottom thereof as is known in the art.

Figure 22:
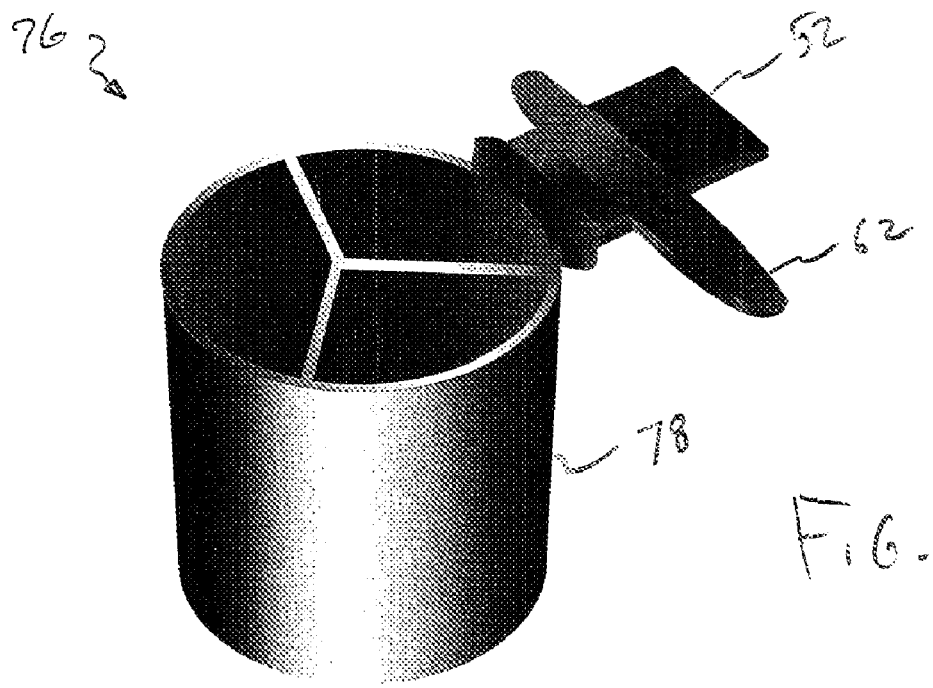
FIG. 22 is a perspective view of a pencil cup holder attachment mechanism in accordance with an embodiment of the invention.
Figure 23:
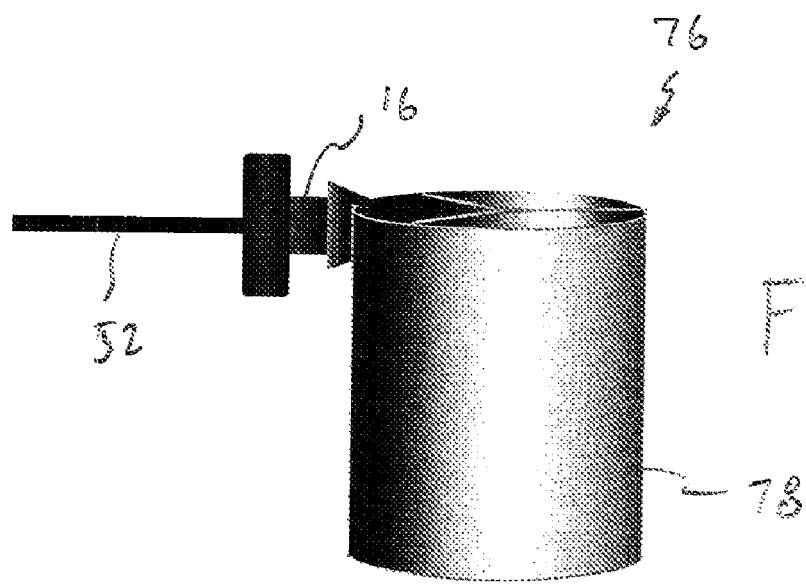
FIG. 23 is a side elevational view of the pencil cup holder attachment mechanism of FIG. 22.
Figure 24:
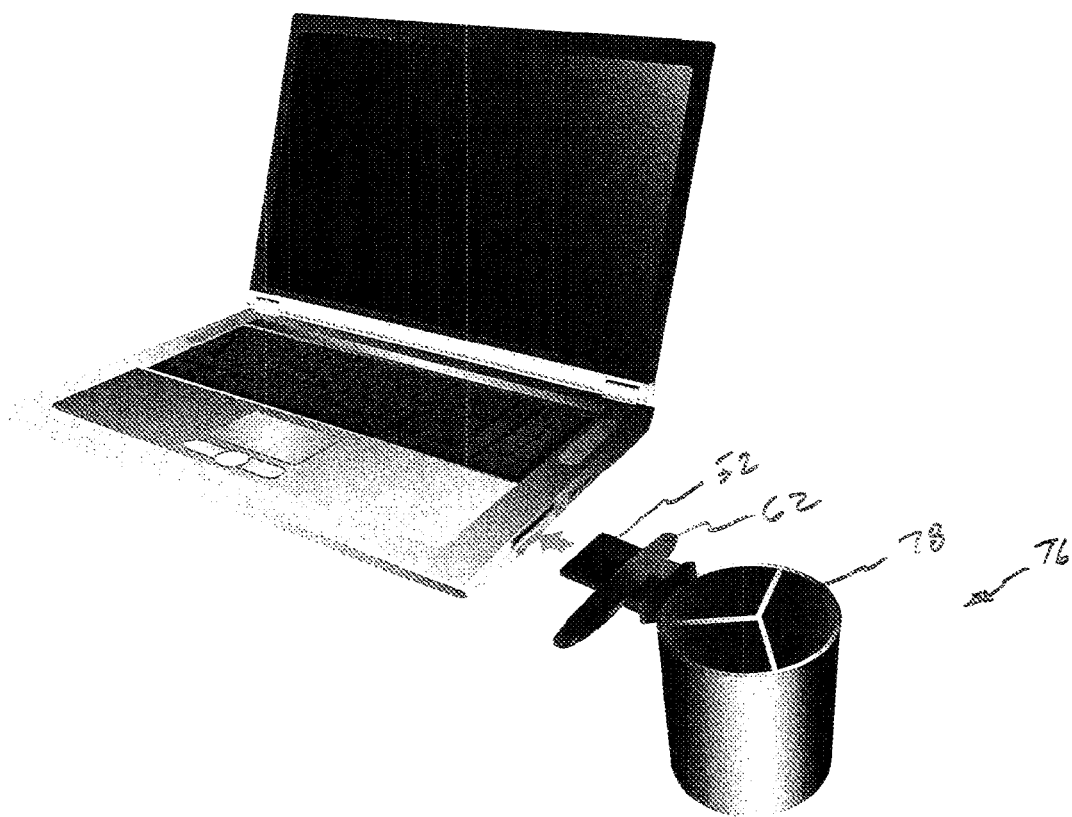
FIG. 24 is a perspective view of a laptop computer with the pencil cup holder attachment mechanism of FIG. 22 exploded therefrom.
Figure 25:
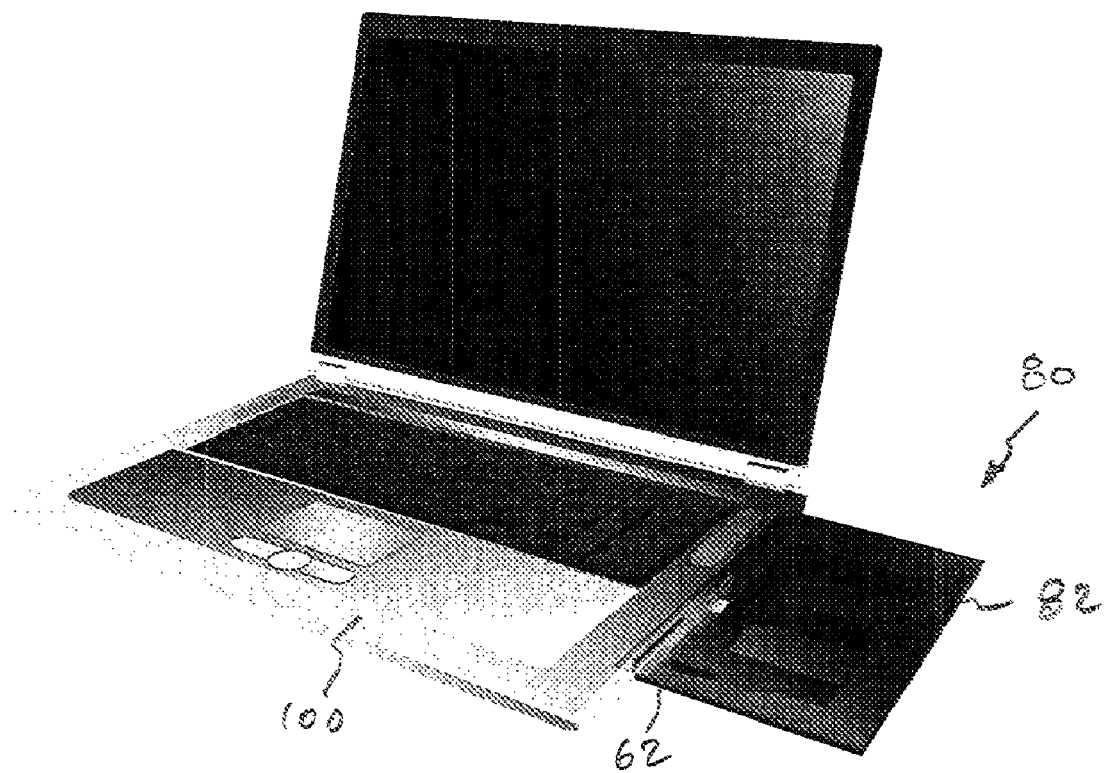
FIG. 25 is a perspective view of a laptop computer with a shelf attachment mechanism in accordance with an embodiment of the invention connected thereto.
Figure 26:
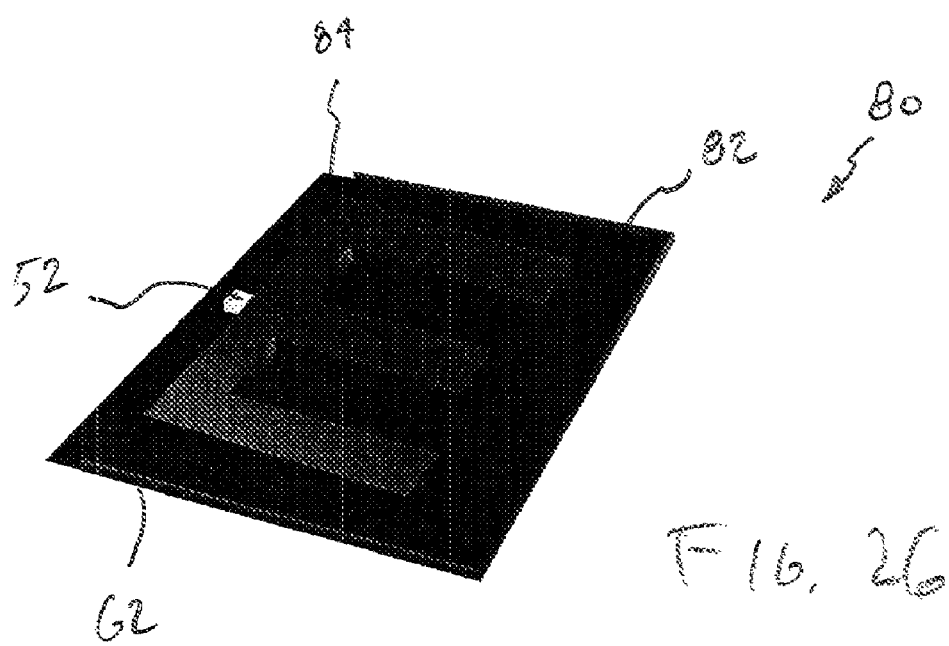
FIG. 26 is a perspective view of the shelf attachment mechanism of FIG. 25 exploded therefrom.

FIGS. 22-24 show a pencil cup holder attachment mechanism 76. The pencil cup holder attachment mechanism 76 is similar to the beverage container holder assembly 10 shown in FIGS. 16-20, but instead of a beverage container holder 14 it includes a pencil holder 78 or the like for holding implements. In another embodiment, the extension member 16 may be attached to the pencil holder 78 near the bottom of the pencil holder 78.

Figure 27:
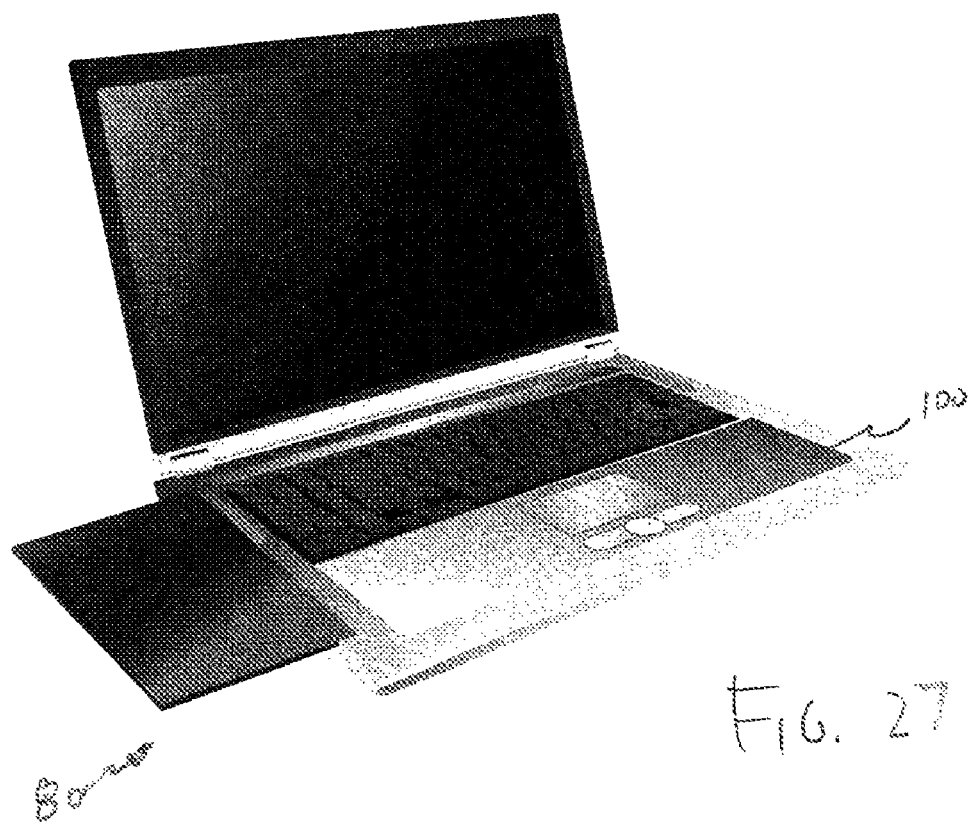
FIG. 27 is a perspective view of a laptop computer with the shelf attachment mechanism of FIG. 25 connected thereto.
Figure 28:
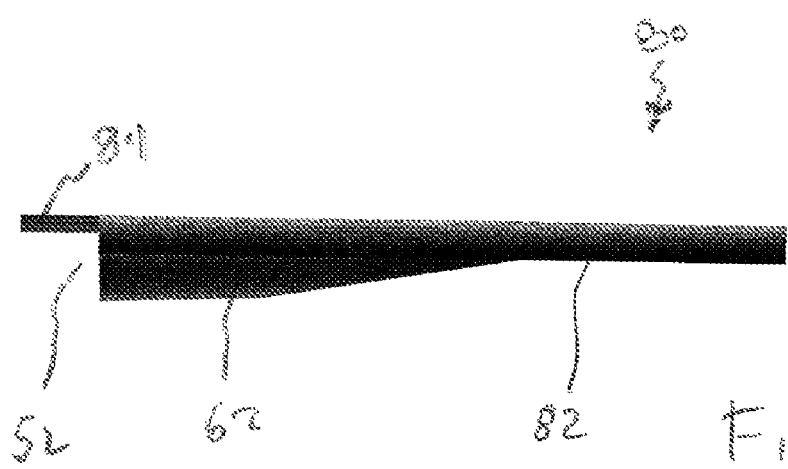
FIG. 28 is a perspective view of the shelf attachment mechanism of FIG. 25.

FIGS. 25-28 show a shelf attachment mechanism 80 that includes a male component 52, a shelf 82, an abutment member 62 an a support ledge 84. Beverages or other items can be placed on the shelf 82 after the male component 52 has been plugged into a female port or the like on a laptop computer 100. The support ledge 84 slides under the laptop to give support. It can also be used upside down, as shown in FIG. 27.

In yet another preferred embodiment of the present invention the cup holder can be configured to heat a cup being held therein. For example, the cup holder may include a wire therein that gives off heat. The foregoing embodiments are merely examples of the present invention. Those skilled in the art may make numerous uses of, and departures from, such embodiments without departing from the spirit and the scope of the present invention. Accordingly, the scope of the present invention is not to be limited to or defined by such embodiments in any way, but rather, is defined solely by the following claims.

What is claimed is:

1. A container support assembly for connecting a container to a structure with a port, the assembly comprising:
    a. a male plug compatible with the port;
    b. an extension member having first and second opposite ends, wherein the male plug is connected to the first end;
    c. a container holder connected to the second end of the extension member opposite the male plug, wherein the container holder defines a central opening that is adapted to receive and support a container, and wherein the container holder includes a pair of curved arms that cooperate to define the central opening wherein the male plug is compatible with a female port on the base of a laptop computer.

2. The container support assembly of claim 1 wherein the container holder is sized to receive and support a beverage container.

3. A method for supporting a container in proximity to a laptop computer; the method comprising the steps of:
    a. providing a container holder assembly that includes a plug which can snuggly fit into the port of a computer and a container holder that has a central opening defined therein;
    b. plugging the plug into the port; and
    c. inserting the container into the central opening such that the container holder supports the container at a fixed spatial distance from the laptop.

4. A computer device support assembly comprising an item holder and a male connector for securely connecting the item holder to the female port of a computer, wherein the item holder defines a central opening that is adapted to receive and support a container, wherein the item holder includes a pair of curved arms that cooperate to define the central opening.

5. The computer device support assembly of claim 4 further comprising an extension member disposed between the male connector and the item holder.

6. The container support assembly of claim 2 further comprising an abutment member extending outwardly from the extension member, wherein the abutment member is adapted to abut against the side of the laptop computer when the male plug is received in the female port.

7. The container support assembly of claim 1 in combination with a laptop computer, wherein the male plug is received in a female port on the laptop computer.

8. The method of claim 3 wherein the container holder includes a pair of curved arms that cooperate to define the central opening.

9. The method of claim 8 wherein the container holder assembly further comprises an extension member disposed between the plug and the container holder.

* * * * *